United States Patent [19]

Zapparoli et al.

[11] 4,238,309

[45] Dec. 9, 1980

[54] APPARATUS FOR ELECTROCHEMICAL DEVELOPMENT OF NUCLEAR RADIATION TRACKS

[75] Inventors: Giorgio Zapparoli, Anguillara Sabazia; Luigi Tommasino, Rome, both of Italy

[73] Assignee: Comitato Nazionale per l'Energia Nucleare—CNEN, Rome, Italy

[21] Appl. No.: 37,227

[22] Filed: May 8, 1979

[30] Foreign Application Priority Data

May 18, 1978 [IT] Italy .............................. 49440 A/78

[51] Int. Cl.² .......................... G01N 27/28; C25B 9/00
[52] U.S. Cl. .............................. 204/195 R; 204/242; 204/252; 204/271; 204/DIG. 6; 204/275
[58] Field of Search ........... 204/242, 271, 275, 224 R, 204/224 M, 195 R, DIG. 6, 130–131, 252

[56] References Cited

U.S. PATENT DOCUMENTS

| 2,531,747 | 11/1950 | Stearn | 204/195 R |
| 3,457,153 | 7/1969 | Helfrich et al. | 204/131 |
| 3,530,045 | 9/1970 | Alburger et al. | 204/195 X |
| 3,554,890 | 1/1971 | Kariya | 204/224 M X |

Primary Examiner—John H. Mack
Assistant Examiner—D. R. Valentine
Attorney, Agent, or Firm—Stevens, Davis, Miller & Mosher

[57] ABSTRACT

An apparatus for the electrochemical development of damage tracks in dielectric transparent material sheets comprises a first elongated prismatic vessel within which an axial cavity is provided extending over most of the prism length and communicating with a circular transverse cavity which extends from an opening on one face of the prism thereinto for less than one half of the prism thickness; said longitudinal and transverse cavities being so dimensioned that when enough liquid is supplied thereinto for abundantly flooding the transverse cavity with the vessel upright and the transverse cavity lowermost, the same liquid will not reach the bottom of the transverse cavity when the vessel is set horizontally with the transverse cavity opening up.

The above vessel is used is combination with a second vessel similar to the first one or with a second prismatic vessel provided with a plurality of openings on one or more of as many faces thereof, the above first vessel being hinged to the second vessel for clamping the sheet or sheets to be developed therebetween.

4 Claims, 5 Drawing Figures

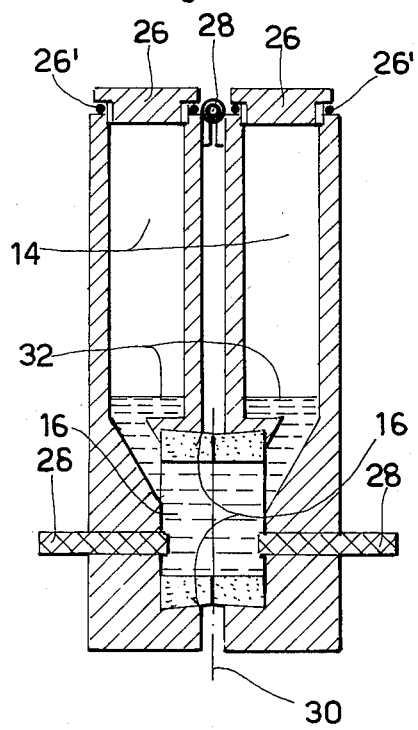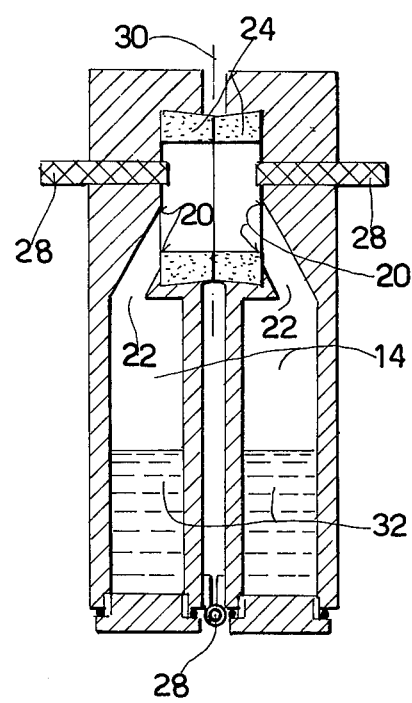

APPARATUS FOR ELECTROCHEMICAL DEVELOPMENT OF NUCLEAR RADIATION TRACKS

The present invention relates to a novel apparatus for the electrochemical development of damage tracks over insulating materials.

Among the various appliances for detecting a beam of charged heavy particles, the apparatus of this invention is specifically adapted for the radon dosimetry through evaluation of the damage tracks produced by α particles in the field of neutron dosimetry or more generally for detecting charged particles fluences by means of insulating material sheets.

The electrochemical development of damage tracks produced by nuclear particles over transparent insulating materials has been disclosed, both as the method and the apparatus, in Italian Pat. No. 929,339 dated on July 6, 1970 of which the inventor is one of the applicants of this application.

A further apparatus of the same class has been disclosed in Italian Patent Application No. 49495A/77 filed May 20, 1977 by the same inventors of this application.

By the chemical attack as claimed in the above patent and application, damage tracks can be developed to such an extent that they become visible to the naked eye thanks to the combined effect of breakdowns localized at the point end of the track itself and of the action of the chemical attack by an appropriate chemical reagent.

In practice the insulating material, previously irradiated by nuclear particles, is interposed between two cells wherein an electrolyte is contained capable—beyond other qualities—of chemical attacking said insulating material; such electrolyte rapidly diffuses along the tracks and changes them into needlelike conductors which penetrates the insulating sheet but not pass through it.

By applying alternate electric fields across the insulating sheet by means of two electrolyte cells which function as electrodes, breakdowns are caused to occur at the pointed ends of the tracks, whereby a certain amount of energy is deposited mostly at the damage area.

Such breakdown phenomena are known as "treeing" and have been observed in practice at the ends of needles driven into dielectric materials.

Due to the combined action of the treeing and chemical attack by the reactive electrolyte, the damage tracks can thus be developed to a macroscopic extent. In practice by said method the count of damage tracks caused by nuclear particles can be carried out by the naked eye or by means of a low magnifying power microscope.

In the particular case of fast neutron dosimetry, the use of twin-cell apparatus and of the dosimeter wherein a dielectric plastic material sheet is employed, suffers from the following limitations:
1. the dosimeter response is too dependent on the direction of the neutron beam;
2. practical problems arise when a great number of dosimeters are to be developed.

Such limitations have been overcome by the use of a detector which is no more in the form of a sheet but in the form of a cylinder or tube as disclosed in the above mentioned Italian Patent Application.

The problems arising when a large number of sheet detectors are to be developed are due mainly to the inadequacy of the presently available development equipment.

In fact the following operations are to be carried out for electrochemically developing a sheet detector according to the current method and apparatus:
(a) inserting the sheet between two cell moieties;
(b) filling the two cell moieties with electrolyte;
(c) developing electrochemically the sheet;
(d) removing the detector and evaluating the damage tracks thereon.

Such procedure is in practice rather laborious particularly when a large number of detectors are to be developed and the worst when highly toxic and caustic reagents are used.

It is therefore a major object of this invention to provide a novel apparatus whereby the filling and emptying of the liquid reagent can be carried out in such a way that the operator never comes to contact said liquid reagent.

A further object of the invention is to use the same batch of liquid reagent for several development operations whereby a saving of time and of chemical reagent is attained along with a safer and speedier handling of the apparatus.

According to this invention the developing apparatus comprises two reservoirs made of insulating material each of which communicates with a moiety of a developing cell and which, when filled with liquid up to a certain level, permits the filling and emptying of the respective cell moiety, these being electrically separated from one another by the sheet detector.

Still according to this invention, after filling said reservoirs up to a certain level with reagent and after inserting the detector sheet between the two juxtaposed cell moieties, a simple upturning of the apparatus causes the liquid of the two reservoirs to drop into the respective cell moiety whereby the detector sheet can be electrochemically developed. The development is initiated by applying an alternate electric field to two electrodes which are sunk each into a respective cell moiety.

Again according to this invention, upon development of the detector sheet, the liquid reagent can be returned to the respective reservoir by simply upturning the apparatus. The latter can thus be disclosed and the detector sheet removed therefrom without any liquid spilling.

Still according to the invention, the apparatus is again ready for an additional operations the liquid reagent being still stored in the reservoirs. After inserting a fresh sheet and clamping it between the two cell moieties a simple overturning of the apparatus is required for starting another development operation.

According to second and third embodiment of this invention, the apparatus may be so constructed that a number of detector sheets can be simultaneously developed, for instance n sheets.

The apparatus of said embodiments comprises a single reservoir for n cell moieties and n reservoirs for the remaining n cell moieties.

The single reservoir for n cell moieties is provided in the lower section of a central block of insulating material which may be a parallelepipedon or a prism in the upper section of which the n cell moieties are provided which are fed with liquid reagent from the single reservoir.

According to all embodiments of this invention, the filling of the reservoirs can be carried out with all the cell moieties mating each other in watertight engagement but without the sheet detector therebetween, the liquid reagent being fed through a supply hole of one whatever of the bodies. The liquid within all the bodies should in no case surpass a level such that upon the overturning of the apparatus a spilling of liquid would occur when the apparatus is opened.

The present invention can be more readily understood from the following description and attached drawings which illustrate by way of example a preferred embodiment of the invention along with some variants thereof.

In the drawings:

FIG. 1 shows two longitudinal cross-sections of the apparatus in operating position (FIG. 1a) and in assembled position after servicing (FIG. 1b);

Figure 2:
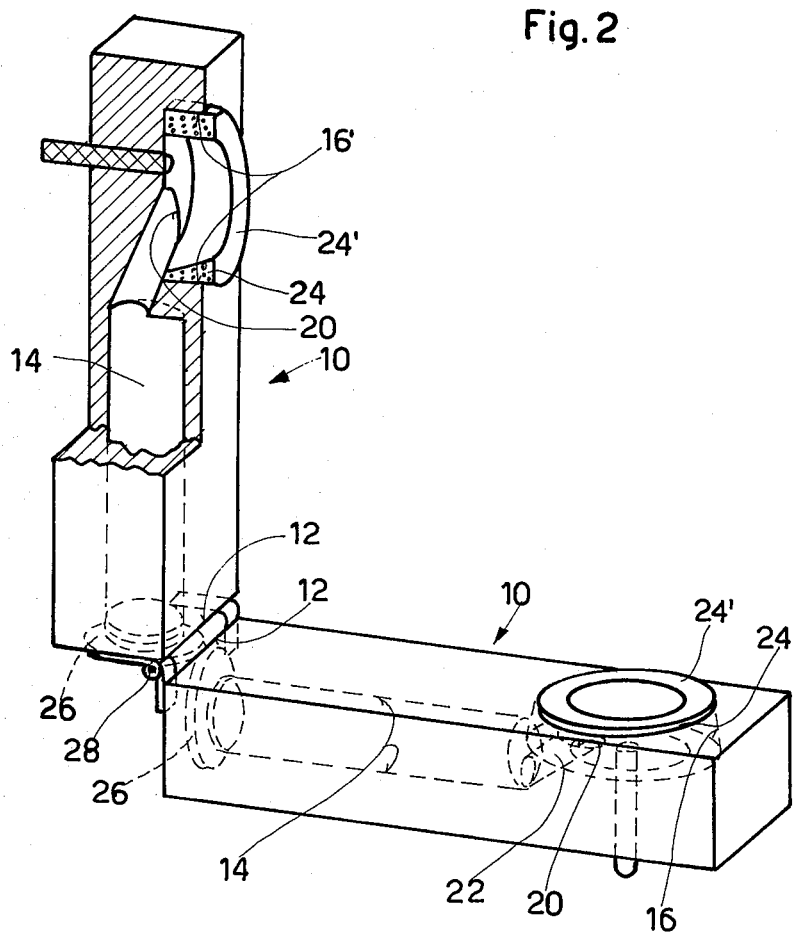
FIG. 2 shows a perspective view of the apparatus in disclosed condition.

With reference to FIGS. 1a, 1b and 2, the apparatus of this invention is therein illustrated for the electrochemical development of sheet detectors one at a time.

It comprises two identical resin bodies generally rectangular prismatic hinged on one another along a corner 12 of the respective base. An axial bore 14 is provided in each of said bodies which extends for a length thereinto. In the rest of each prismatic body a transverse hole 16 is provided on the face of the prism provided with said hinge, which hole has the shape of a truncated cone with the larger base facing inwards of the prismatic body; the diameter of said larger base being slightly less than the length of said corner 12. Hole 16 extends into the prism for a depth about one third of the prism.

On the bottom of hole 16 there is the opening 20 of a cylindrical duct 22 slanting with respect to the body longitudinal axis, which duct, at the other end, opens into said axial bore 14 at the level of the bottom end thereof, the generatrices of the axial bore 14 and of slanting duct 22 intersecting each other at said level.

Axial bore 14 is intended for functioning as a reservoir of a liquid reagent, while hole 16 functions as a moiety of a development cell. A resilient gasket 24 is fitted into hole 16 which projects from face 18 of the prism to form an annular flat surface parallel to face 18 which is intended for engaging a correspondent gasket of the other hinged body 10.

Each of the two bodies is provided with an electrode 28 which penetrates body 10 from the outside thereof the issues at the bottom of hole 16 at a location free from opening 20 of duct 22.

The openings of the axial bores at the surface of bodies 10 are closed by means of plugs 26 and seals 26'.

OPERATION

Figure 3:
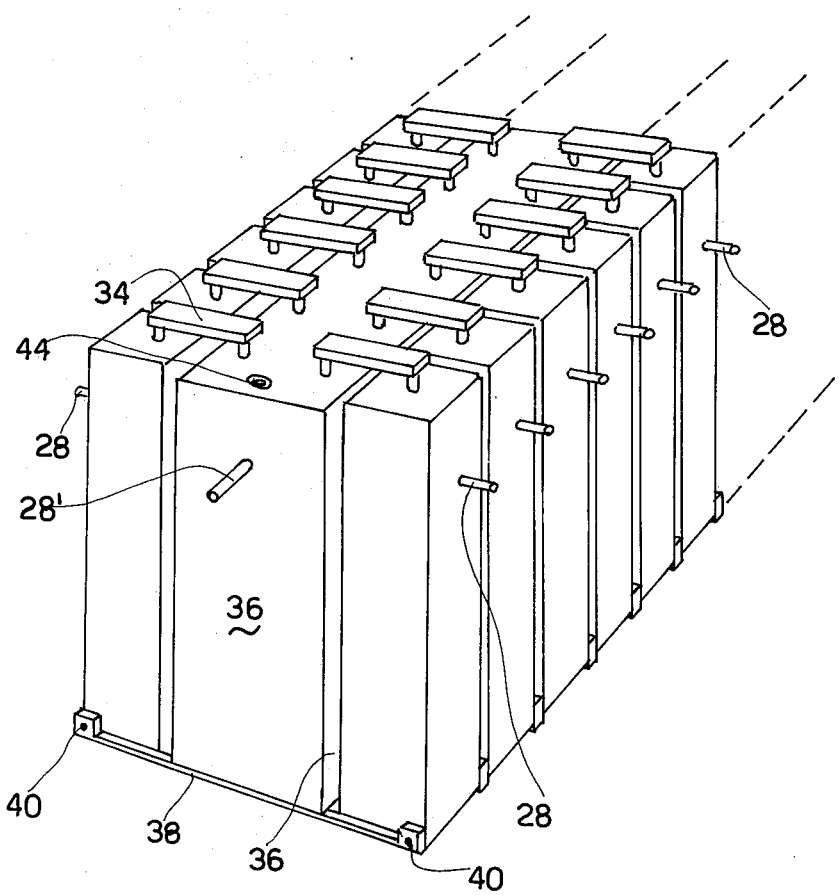
FIG. 3 shows the apparatus of the invention in a second embodiment adapted for the simultaneous development of a plurality of sheet detectors.
Figure 4:
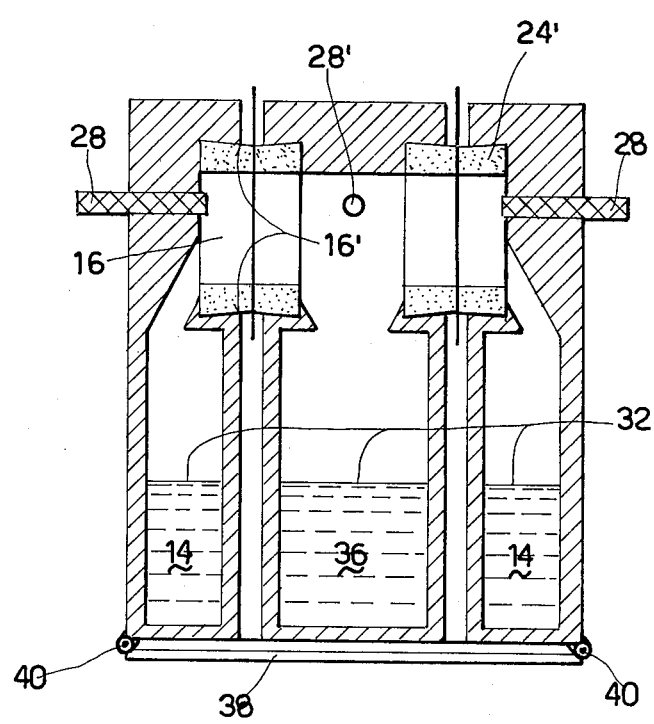
FIG. 4 shows a vertical median cross-section of a pair of cells of the apparatus of FIG. 3.

Bodies 10 are laid down on a plane with the respective faces 18 upwards; reservoirs 14 are filled about one half through hole 16 with liquid reagent; gaskets 24' are then brought to mate with the sheet detector 30 inserted therebetween and subsequently pressed together and fastened by means, for instance, of legged bars 34 as shown in FIGS. 3,4. The apparatus, which, after the above operations, is in the position of FIG. 1b, is now overturned to assume the position of FIG. 1a. An appropriate alternate or pulsated voltage is now applied across electrodes 28 and subsequently the apparatus is placed in a constant temperature environment, for instance a thermostated oven, where it is maintained for a period of time as required for the electrochemical development of the tracks, whereupon it is removed from the oven and the voltage disconnected from electrodes 28.

The apparatus is then upturned and the fastening means 34 removed. At this point, the developed sheet 30 can be replaced with a fresh sheet and all the process steps repeated as for the first sheet.

From the above it becomes apparent that reservoir 14, hole 16 and duct 22 should be so dimensioned that with enough electrolyte supplied into body 10 for abundantly flooding hole 16 when said body is in upright position as shown in FIG. 1a, the same electrolyte will not reach the bottom of hole 16 when body 10 is set horizontally with the opening of hole 16 facing upwards.

With reference to FIGS. 3 and 4, a second embodiment of the invention is therein illustrated for the simultaneous development of a plurality of sheet detectors.

The apparatus according to the second embodiment of the invention comprises a parallelepipedal box 36 made of insulating material, intended for engaging a plurality of bodies 10 as above described, box 36 being provided, on two opposite faces thereof 36', with as many windows 16 as are the bodies 10 to be coupled to the box.

Bodies 10 are hinged on hinges 40 of a frame 38 attached to the box.

An electrode 28' penetrates through the wall of box 36 and projects thereinto. For keeping bodies 10 in abutment with box 36, legged bars 34 are provided. Box 36 is provided with a plughole 44 for supplying the liquid thereto. The liquid level can be made observable by making the box walls transparent.

The apparatus operation is the same as described with reference to the body pair of FIG. 1a and 1b, with the exception that box 36 is filled while keeping it upright as shown in FIGS. 3 and 4.

Figure 5:
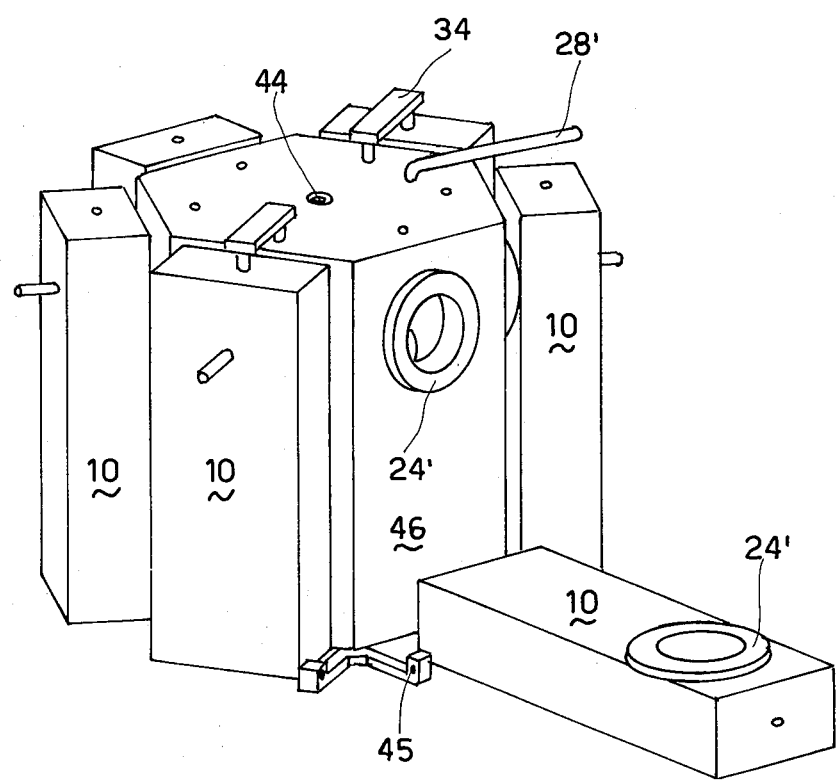
FIG. 5 shows an apparatus for the simultaneous development of six sheet detectors according to a third embodiment of the invention.

A third embodiment of the invention is illustrated in FIG. 5. It is very similar to the above second embodiment with the exception that parallelepipedal box 36 is replaced by a prismatical 46 with regular polygonal transverse cross-section (an hexagon in FIG. 5.).

Also in this case there is an electrode 28' which penetrates the box wall and projects thereinto; box 36 being again provided with a supply opening 44.

The embodiments of FIGS. 3, 4, 5 permit the electrochemical development process to be carried out the same as with the first embodiment, that is to say without any need for removing the chemical reagent after each development operation, in as much as the reagent is transferred from the cells to the reservoirs and vice versa by simply overturning the whole apparatus.

What is claimed is:

1. An apparatus for the electrochemical attack of insulating material thin sheets which apparatus comprises a first elongated hollow body with top and bottom flat bases and a flat face on which a window is provided which gives access to a cavity into which an electrode projects extending watertight through the cavity wall to reach the outside thereof; said window being provided with a gasket surrounding the cavity opening and projecting from said face, said first hollow body being hinged on a second hollow body which too is provided with at least one flat face on which a window is provided in such a position that, by rotating said two bodies about their common hinge, their two windows are brought to mate; said hollow body being provided with an elongated chamber extending over about the whole length of the body not occupied by said cavity the latter communicating with said chamber through a conveying means; the capacity of said chamber being at least twice the capacity of said cavity plus the conveying means capacity.

2. An apparatus as claimed in claim 1, wherein said hollow body is a hollow prism with rectangular transverse cross-section; said flat face of the hollow body is one face of the prism; said two bodies are hinged to one another along the corresponding end corner of said flat face; said cavity has the shape of a truncated cone with the smaller base coplanar with said flat face; said chamber of the body being cylindrical and communicating with the larger base of said frustoconical cavity through a cylindrical duct.

3. An apparatus as claimed in claim 1, wherein said second vessel is a paralelepipedal box provided over two opposite faces with a series of windows; each window of said series being adapted for mating the window of one of said first hollow bodies when the latter is rotated about a pin hinge of which said box is provided along the lower side of said opposite faces; said box being provided with an electrode which passes watertight and insulatedly through the box wall.

4. An apparatus as claimed in claim 1 wherein said second hollow body is a prismatic polygonal box provided at each face thereof with a window adapted for mating the window of a corresponding first hollow body when the latter is rotated about an hinge connected to said prismatic box, the latter being provided with an electrode which extends watertight from the inside to the outside of the box.

* * * * *